United States Patent
Sekiyama (12)

(10) Patent No.: US 6,427,115 B1
(45) Date of Patent: Jul. 30, 2002

(54) PORTABLE TERMINAL AND ON-VEHICLE INFORMATION PROCESSING DEVICE

(75) Inventor: Hiroaki Sekiyama, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/593,542

(22) Filed: Jun. 14, 2000

(30) Foreign Application Priority Data

Jun. 23, 1999 (JP) .......................................... 11-176945

(51) Int. Cl.⁷ ............................. G01S 3/02; H01B 1/10; G08G 1/096
(52) U.S. Cl. ....................... 701/208; 701/36; 701/212; 340/990
(58) Field of Search ........................ 701/36, 208, 212, 701/213, 201, 207, 211; 340/990, 995, 988, 989, 991, 992

(56) References Cited

U.S. PATENT DOCUMENTS

| 4,876,710 A | * | 10/1989 | Reed et al. ..................... 379/63 |
| 5,339,239 A | * | 8/1994 | Manabe et al. ............. 364/401 |
| 5,450,471 A | * | 9/1995 | Hanawa et al. ................ 379/58 |
| 5,794,164 A | | 8/1998 | Beckert et al. ................. 701/1 |
| 5,819,227 A | * | 10/1998 | Obuchi ........................... 705/1 |
| 5,867,794 A | * | 2/1999 | Hayes et al. ................ 455/557 |
| 6,032,054 A | * | 2/2000 | Schwinke ................... 455/557 |
| 6,061,003 A | * | 5/2000 | Harada ....................... 340/995 |
| 6,087,952 A | * | 7/2000 | Prabhakaran ............ 340/693.5 |
| 6,097,940 A | * | 8/2000 | Sekiya et al. ................ 455/411 |
| 6,119,095 A | * | 9/2000 | Morita ........................... 705/5 |
| 6,122,682 A | * | 9/2000 | Andrews ...................... 710/65 |
| 6,125,326 A | | 9/2000 | Ohmura et al. ............. 701/213 |

FOREIGN PATENT DOCUMENTS

| DE | 197 43 371 A1 | 9/1998 |
| EP | 0 763 808 A2 | 3/1997 |
| EP | 0 901 000 A2 | 3/1999 |
| JP | A-10-63728 | 3/1998 |
| JP | 10160490 | 6/1998 |
| JP | A-11-500084 | 1/1999 |

* cited by examiner

Primary Examiner—Tan Nguyen
Assistant Examiner—Dalena Tran
(74) Attorney, Agent, or Firm—Oliff & Berridge, PLC

(57) ABSTRACT

A portable terminal and an on-vehicle device are combined such that effective navigation can be provided. The portable terminal provided with communication function is connected with the on-vehicle information processing device when placed on a cradle. The portable terminal transmits a destination to an information center, and shows obtained route data on a display while transmitting the route data to the on-vehicle device which outputs guidance speech from a speaker. On arriving near the destination, the on-vehicle information processing device provides the portable terminal with map data for the vicinity of the destination. A user can remove the portable terminal from the cradle and reach the destination while viewing a map shown on the display of the portable terminal.

17 Claims, 4 Drawing Sheets

(a) 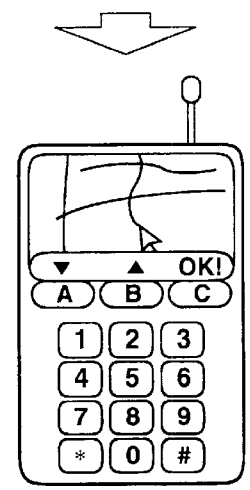

OCCURRENCE OF EVENT
- WHERE ROUTE INFORMATION CHANGES DUE TO CHANGE IN TRAFFIC CONDITIONS
- OTHER INFORMATION
- EVENT NEAR CURRENT POSITION
- RELEVANT LATEST INFORMATION

OK!
COMMAND DATA
OR
AUDIO DATA (b) 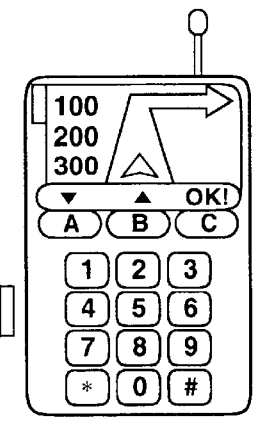

NEW ROUTE WILL BE GUIDED

TURN RIGHT AT INTERSECTION WHERE YOU SEE "XXX".

(c) 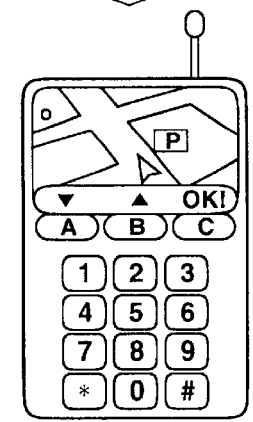

YOU HAVE ARRIVED AT A PARKING LOT NEAR DESTINATION

THE RESTAURANT IS 2 MINUTE WALK

TODAY'S RECOMMENDED LUNCH SPECIAL GOES FOR $30

Fig. 4

PORTABLE TERMINAL AND ON-VEHICLE INFORMATION PROCESSING DEVICE

BACKGROUND OF THE INVENTION

1. Field of the Invention

The present invention relates to an on-vehicle information processing device, and more particularly to an on-vehicle device and a portable terminal for providing information.

2. Description of Related Art

Various computer-based systems for supplying information to vehicles have been proposed. For example, PCT Patent Application Japanese Publication(JP-T2) No. Hei 11-500084 discloses a computer system for a vehicle comprising a face plate module, a support module, and a computer module. The face plate module includes a digital signal processor and is detachably mounted to the computer module. The face plate module may also include an AM/FM tuner, a display, a keypad and a CODEC so as to operate as a portable radio, and can also function as a portable telephone using a CODEC including a speaker and a microphone. Reception of paging information as well as acquisition of voice notes is also possible through the face plate module. Electrical power is supplied from an independent power supply such as a battery to the face plate module when it is detached from the computer module.

In the aforementioned system, however, the face plate module serves as a navigation system only when it is connected to the computer module and the function of such a navigation system is not available when it is disconnected from the computer module. Therefore, when, for example, a user leaves the vehicle and walks to a destination while carrying the face plate module, the face plate module cannot display map data or the like desired by the user.

SUMMARY OF THE INVENTION

The present invention was conceived in view of the foregoing problem of the related art, and aims to provide a system which achieves further functional cooperation between an on-vehicle device and a portable terminal and can provide navigation functionality in a more user-friendly manner.

To this end, a portable terminal in accordance with the present invention, which is capable of being connected to an on-vehicle device, comprises a bi-directional data communication device, a display capable of displaying text and image information, a memory for storing data, and a processor for receiving/transmitting various data from/to an information center in accordance with connected/disconnected states of the portable terminal with respect to the on-vehicle device, in which, when the portable terminal is in a disconnected state, displays data on said display based on data obtained from the on-vehicle device during an earlier connected state.

Preferably, said bi-directional data communication device, when the portable terminal is connected with the on-vehicle device, transmits information representing the connected state to the information center. Further, the bi-directional data communication device, when the portable terminal is connected with the on-vehicle device, may transmit audio data supplied from said on-vehicle device to said information center and transmits data received from the information center to the on-vehicle device. Further, the bi-directional communication device, in the connected state, may transmit running data supplied from the on-vehicle device to the information center. Still further, the bi-directional communication device may receive/transmit audio data to/from the information center while the portable terminal is connected to the on-vehicle device, and receive/transmit non-audio data with respect to the information center while the portable terminal is disconnected from the on-vehicle device. When the portable terminal is disconnected from the on-vehicle device, the bi-directional communication device may show map data obtained from the on-vehicle device on the display while the portable terminal is connected therewith.

In accordance with another aspect of the present invention, there is provided an on-vehicle information processing device comprising an interface to be connected with the above-mentioned portable terminal, and a processor for processing data supplied from said portable terminal.

Preferably, the on-vehicle information processing device further comprises a detector for detecting a current position of the vehicle on which the device is mounted, and said processor executes navigation function based on said current position and data supplied from said portable terminal. The on-vehicle information processing device further comprises a microphone and a speaker, and said processor transmits sound input through said microphone to the portable terminal and outputs the audio data supplied from the portable terminal through the speaker. The on-vehicle information processing device may further comprise means for supplying electrical power to said portable terminal. When the current vehicle position detected is near a selected destination, said processor provides the portable terminal with map data showing the vicinity of the destination. When the current vehicle position detected is near the destination, the processor also transmits data indicating that the vehicle has arrived near the destination, to the portable terminal. Further, when the on-vehicle device is connected with the portable terminal, the processor transmits data indicating the connected state to the information center via the portable information terminal device.

According to the present invention, the portable terminal, when disconnected from the on-vehicle information processing device, solely functions to receive/transmit data from/to the information center or the like. The bi-directional data communication device includes both a communication device for communicating with a remote information center and a communication device for communicating with the on-vehicle information processing device, such that when the portable terminal functions as an independent unit, it receives/transmits predetermined data from/to a remote information center or the like. When, on the other hand, connected with the on-vehicle information processing device, the portable terminal can utilize functions provided by the on-vehicle device, to thereby achieve a higher level of data reception/transmission. The data acquired from the information center or the like by means of the bi-directional communication device is supplied to the on-vehicle information processing device for processing. The acquired data may also be displayed on the portable terminal. For example, when map data is acquired from the information center or the like to execute navigation function, the portable terminal may serve as a navigation screen for displaying the map data and guidance routes. When a vehicle arrives near the destination and a user leaves the vehicle to proceed to the destination on foot, the portable terminal is disconnected from the on-vehicle information processing device. Because the portable terminal has been provided with necessary data from the on-vehicle information processing device while being connected thereto, the user can reach the destination while relying on only the portable terminal. Further, when the portable terminal is provided with power from the on-vehicle information processing device while it is connected with the on-vehicle device, power deficiency while the portable terminal is being carried can be avoided.

BRIEF DESCRIPTION OF THE DRAWINGS

These and other objects of the invention will be explained in the description below, in connection with the accompanying drawings, in which:

FIG. 4 is another explanatory view of the process according to the embodiment of the present invention.

DETAILED DESCRIPTION OF THE PREFERRED EMBODIMENT

A preferred embodiment of the present invention will be described in further detail with reference to the accompanying drawings.

Figure 1:
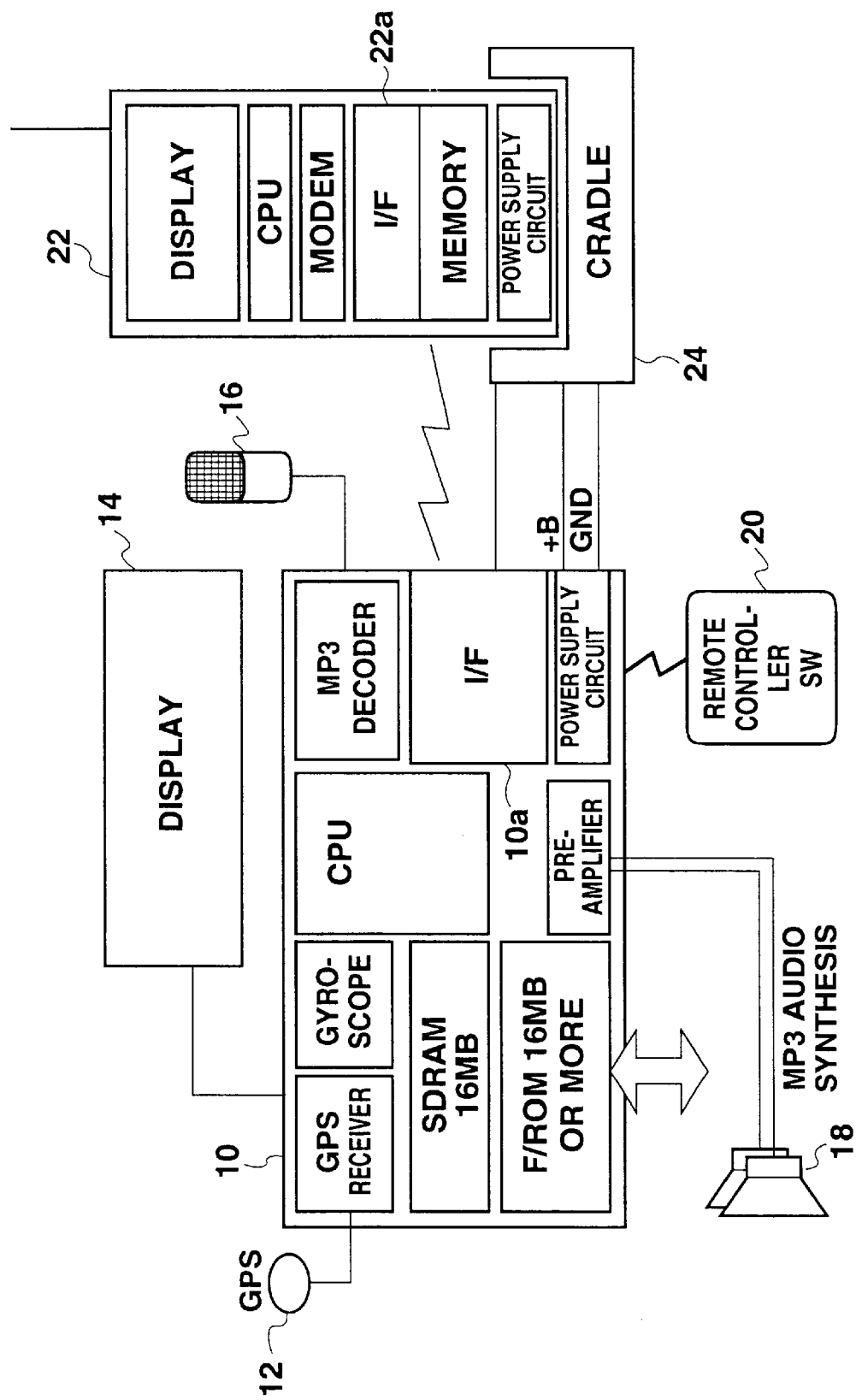
FIG. 1 is a diagram showing the system structure of an embodiment of the present invention.

Referring to FIG. 1, a system structure is shown in a state where a portable terminal and an on-vehicle information processing device are connected.

The on-vehicle information processing device 10 comprises a GPS receiver, a gyroscope, an SDRAM (synchronous 16 MB DRAM), a flash ROM (16 or more MB) or a hard drive, a CPU, a preamplifier, an MP3 decoder, an interface I/F 10a, and a power supply circuit.

The GPS receiver receives a signal from a GPS antenna 12 to determine a current position of the vehicle, data for which is then supplied to the CPU.

The gyroscope detects orientation of the vehicle and supplies the data to the CPU. The detected orientation is used together with the speed of the vehicle to determine a relative displacement of the vehicle from a predetermined position. The current position of the vehicle can be determined with a high accuracy based on the position data from the GPS and the relative displacement data.

The MP3 decoder demodulates MP3 data, which is audio data compressed using the MPEG1 data compression format. The MP3 data is obtained by the portable terminal 22 via the Internet, for example, and is supplied to the on-vehicle information processing device 10.

The interface I/F 10a, which corresponds to radio or to the USB, RS232C, RS232E, or IEEE1394 standards, receives/transmits data from/to the portable terminal 22. The portable terminal 22, when placed on a cradle 24 connected to the interface I/F 10a, can communicate with the on-vehicle information processing device 10. The cradle 24 is also connected to the power supply circuit of the on-vehicle information processing device 10, such that electrical power is supplied from the power supply circuit to charge the portable terminal 22 when it is placed on the cradle. (+B represents a power supply line in FIG. 1)

Upon detecting that the portable terminal 22 is placed on the cradle 24 and is connected to the on-vehicle device 10, the CPU processes data supplied from the portable terminal 22 and provides the processed data back to the portable terminal 22 via the I/F 10a and the cradle 24. When map data is supplied from the portable terminal 22, the on-vehicle device executes navigation function based on the current position detected by the GPS receiver and the gyroscope. It is to be noted that the navigation function includes a process for searching a route to a preset destination and a guidance function along the searched route by means of display or speech, as well as provision of information regarding the searched route, information of facilities around the route, and information regarding the destination. Further, if a microphone 16 and a speaker 18 are connected to the on-vehicle information processing device 10, the on-vehicle information processing device 10 supplies audio data input through the microphone 16 to the portable terminal 22 and outputs audio data supplied from the portable terminal 10 through the speaker 18. Although the audio data input through the microphone 16 may be directly supplied to the portable terminal 22, audio recognition may be applied in the CPU such that the recognition results are supplied to the portable terminal 22. When MP3 data is supplied from the portable terminal 22, the data is demodulated by the MP3 decoder before being output from the speaker 18 as audio data. The demodulated audio data may also be output from an output terminal (not shown) to other audio devices or the like. The on-vehicle information processing device 10 may further comprise a display 14. It should be noted, however, that a main display screen for the on-vehicle information device 10 is provided in the portable terminal 22, such that data processed in the on-vehicle information processing device 10 is supplied to the portable terminal 22 and is displayed on the display thereof.

The portable terminal 22, on the other hand, comprises a power supply circuit, an interface I/F 22a, a MODEM, a CPU, a display, an antenna, and a memory.

The power supply circuit includes a secondary battery for supplying a power to the CPU or the like. As already described, the secondary battery is charged with power from the on-vehicle information processing device 10 when the portable terminal 22 is placed on the cradle 24 to thereby be connected with the on-vehicle information terminal device 10.

The interface I/F 22a receives/transmits data with regard to the interface I/F 10a of the on-vehicle information processing device 10, and may correspond to radio or to the USB, the RS 232C, RS232E, or IEEE394 standards. Although normally digital data is exchanged during communication between the portable terminal 22 and the on-vehicle information processing device 10, audio data may also be transmitted. Thus, preferably a switching function between data communication and audio communication may be provided. TCP/IP may be used, for example, for digital data communication.

The MODEM converts digital data supplied from the on-vehicle information processing device 10 into audio data and also converts data in audio data format obtained from the information center or the like via the antenna into digital data, which is then supplied to the CPU of the portable terminal 22 or to the on-vehicle information processing device 10.

The CPU, detecting that the portable terminal 22 is placed on the cradle 24 and is connected with the on-vehicle information processing device 10, supplies data acquired from the information center or the like to the on-vehicle information supplying device 10 while storing data supplied from the on-vehicle information processing device 10 on the memory or transmitting such data to the information center via the MODEM and the antenna. The portable terminal 22 also comprises a microphone and a speaker (not shown) as in a general portable telephone, such that it can solely function as a portable telephone capable of communication via a telephone line.

The display shows data obtained from the information center and also displays data supplied from the on-vehicle information processing device 10 and stored in the memory. When the portable terminal 22 is disconnected from the on-vehicle information processing device 10, the display shows data obtained from the information processing device 10 and stored in the memory before disconnection, namely while the portable terminal was connected to the information processing device 10.

In the system thus configured, an example process for executing a navigation function will be described.

Figure 2:
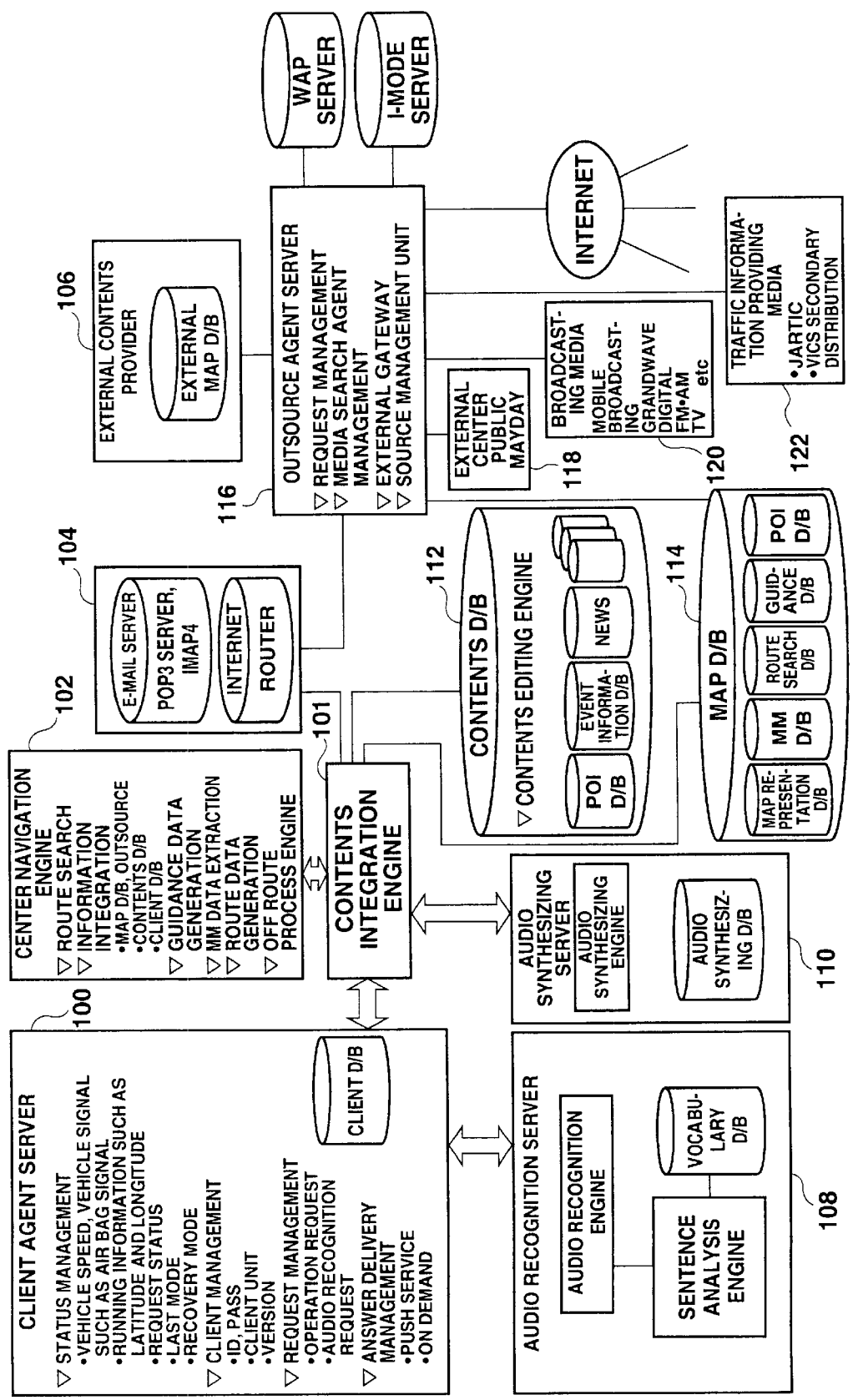
FIG. 2 is a conceptual structural diagram at the information center side according to the embodiment of the present invention.

Referring to FIG. 2, a system conceptual view of an information center which communicates with the portable terminal 22 shown in FIG. 1 is depicted. The information center includes a plurality of servers and databases, and data related to a user's request is integrated to be supplied to the user.

A client agent server 100 which manages individual user information processes running condition of a vehicle (speed or current position), individual information of a user (ID or password PASS), and user queries. The client agent server 100 includes a client database D/B for user identification.

When a user (client) transmits a request in an audio data format, an audio recognition server 108 interprets the audio data and supplies the results of interpretation to the client agent server 100. For this process, the audio recognition sever 108 includes a sentence analyzing engine and a vocabulary database D/B.

A center navigation engine 102 provides data necessary for navigation function, specifically, map data, route data obtained by search for a route to a destination, or the like.

An electronic mail server 104 is connected to the Internet to manage reception/transmission of electronic mail.

A contents database D/B 112 stores various facility or event information and news information, which is supplied to a contents integration engine 101. Map drawing data for display and map data for route search contained in a map database D/B 114 is also supplied to the contents integration engine 101.

An audio synthesis server 110 which includes an audio synthesis engine and audio synthesis database D/B supplies audio data, required for providing information to the user in speech, to the contents integration engine 101.

The contents integration engine 101 integrates map data or route data to the destination, facility or event information, news information, electronic mail information or the like required by a user, and supplies the integrated data to the user as audio or digital data.

An external content provider 106, an outsource agent server 116, an external center 118, a broadcasting media 120, and a traffic information providing media 122 are used for providing various information of external organizations such as ground wave digital broadcasting and radio broadcasting.

A process in accordance with the embodiment of the present invention will be described in detail with reference to FIGS. 3 and 4.

Figure 3:
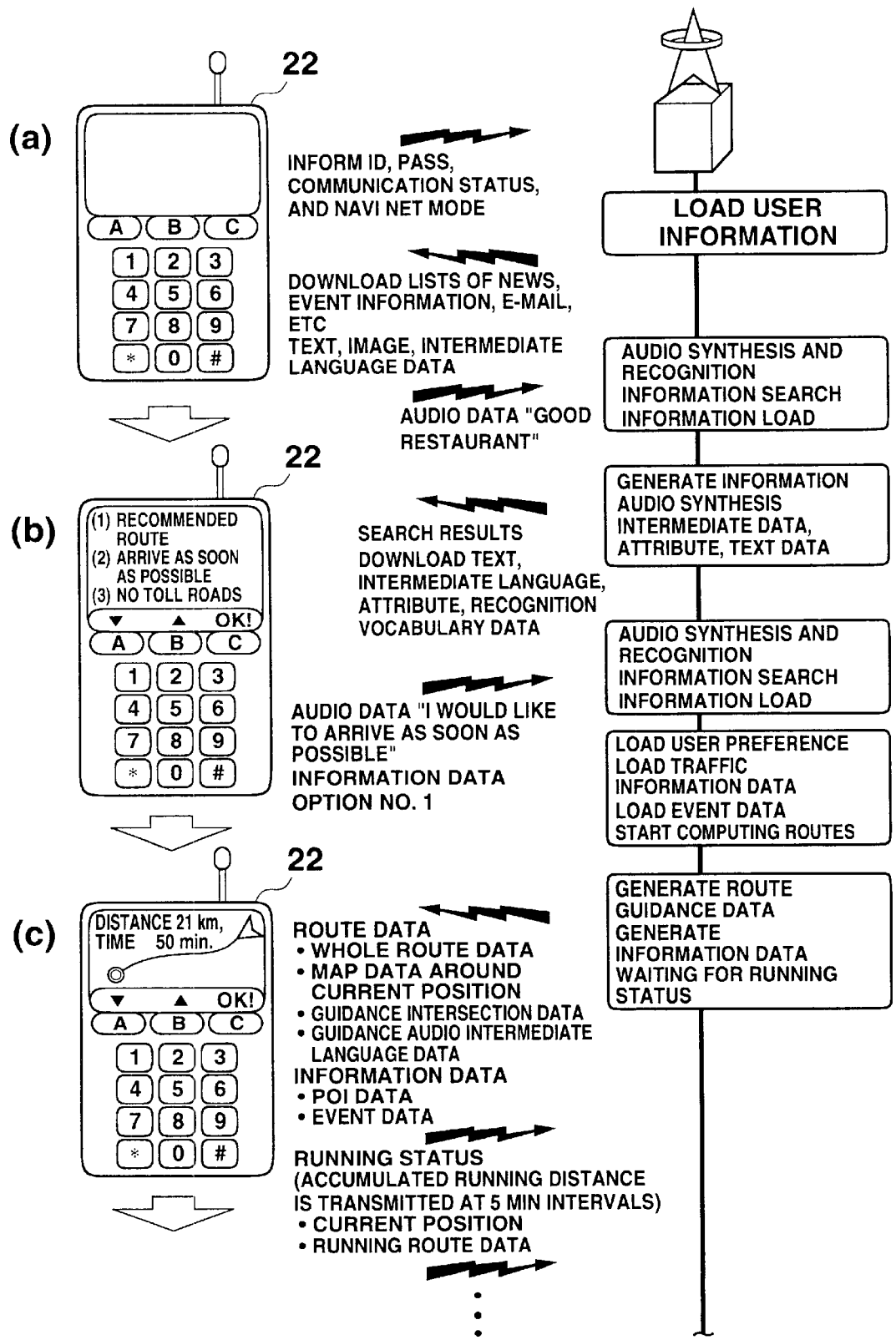
FIG. 3 is an explanatory view of the process according to the embodiment of the present invention.

Referring to FIGS. 3 and 4, how data is received/transmitted between the portable terminal 22 and the information center when executing navigation function is depicted in time series. The portable terminal 22 is placed on the cradle 24 and is therefore connected with the on-vehicle information processing device 10. When the portable terminal 22 is placed on the cradle 24, the CPU of the on-vehicle information processing device 10 or the CPU of the portable terminal 22 detects the connected state and sends the ID or the password PASS of the user stored in the F/ROM of the on-vehicle information processing device 10 to the information center using the telephone function of the portable terminal 22. At this point, it is preferable that communication status or information indicating the connection state (which is referred to as "NAVI NET mode" in FIG. 3, for convenience) be sent to the information center. The information center, upon receiving such data, verifies the user ID and the password PASS and integrates electronic mails addressed to the user, event information, news or the like for supplying to the user. Receiving the data from the information center, the portable terminal 22 supplies the received data to the on-vehicle information processing device 10, which then outputs the supplied data through the speaker 18 by, for example, vocalizing "Hello, Mr./Ms. XXX. New information on good restaurants and bargains is available. What would you like?"

Upon receiving in response a user input "a good restaurant, please" through the microphone 16 in response to the aforementioned audio output, the on-vehicle information processing device 10 supplies the user's input audio data to the portable terminal 22, which then transmits the data to the information center. The information center, upon receiving the request data, analyzes the request contents using audio recognition, searches and retrieves data related to the request, and then transmits the received data to the portable terminal 22. While data is being searched, it is preferable to inform the user of the state of searching by outputting, through the speaker 18, a message such as "the route to a good restaurant is now being searched". Completion of search is informed by sending search completion data. In this example, three routes to the destination are retrieved and the user is prompted to select among them. This prompt is transmitted in the form of text or audio data. The text data is displayed on the display of the portable terminal 22; in FIG. 3, options including "recommended route", "arrive as soon as possible" and "no toll roads" are shown. The audio data may also be output through the speaker 18 of the on-vehicle information processing device 10 by vocalizing "Search is completed. Which do you prefer, my recommended route, the fastest rout, or a route with no toll roads?".

When, in response to such audio output or display, the user inputs "I would like to arrive as soon as possible" through the microphone 16 or by inputting a reply into a keypad of the portable terminal 22, the portable terminal 22 transmits this preference data to the information center. The information center then searches for a corresponding route by recognizing the transmitted audio data or based on the information data. Such a route search is performed based on the user's preference, traffic information, and event information and the result is informed. The route data to be informed includes whole route data, map data near the current position, guiding intersection data, guidance audio data, facility information data, event information data or the like. The initial position of the vehicle can be transmitted at the same time when informing the user ID, password, communication status, or connection mode. The route data received by the portable terminal 22 is supplied to the on-vehicle information processing device 10, which superposes the current position detected by the GPS and the gyroscope with the map data while further superposing the guidance route to the destination, and supplies the data to the portable terminal 22 for display. If the portable terminal 22 has sufficient memory and processing speed, the portable terminal 22 may receive the current position of the vehicle from the on-vehicle information processing device 10 and process that information such that the current position and the guidance route can be superposed on the map data. The on-vehicle information processing device 10 continuously checks the guidance route and the current position of the vehicle to determine timing for audio output through the speaker 18, which guides, for example, "Turn right at the next crossing". Further, while such navigation is provided, the on-vehicle information processing device 10 supplies the running status (speed or the like) of the vehicle or the current position data to the portable terminal 22 at predetermined intervals (of time or distance), such that the portable terminal 22 transmits the data to the information center for the user's understanding.

When the situation which the information center recognizes changes before a user's arrival at the destination, such as when an accident or traffic congestion occurs along the route, the information center provides the portable terminal 22 with new event information. The user may at this time request a new route through the microphone 16 or using the keypad of the portable terminal 22. The information center searches for a new route in accordance with the request and provides the results. The portable terminal 22 then transmits the data supplied from the information center to the on-vehicle information processing device 10, which provides audio output such as "A new route will be provided" through the speaker 18 while showing the new route on the display.

The on-vehicle information processing device 10, upon detecting that the vehicle has arrived near the destination based on the guidance route and the current position, outputs a guidance for the user such as "You have arrived at a parking lot near the destination. The restaurant is a two minute walk. Today's recommended lunch special goes for 30 dollars". Information regarding time to be taken from the parking lot to the restaurant or regarding the menu is contained in the data transmitted from the information center and is read out from the memory and output by the on-vehicle information processing device 10 when the user has arrived at the parking lot.

While providing such guidance, the CPU of the on-vehicle information processing device 10 also supplies map data or route data in the vicinity of the restaurant as well as data regarding the restaurant (menu or an image of the shop) to the portable terminal 22, which stores the supplied data in the memory and displays the map data on the display. Thus, even when the portable terminal 22 is detached from the cradle 24, the user can easily refer to the map shown on the display to reach an intended destination. The user can reach the intended destination more easily if the portable terminal 22 is provided with a GPS system for indicating the user's position on the map data.

In the above-mentioned embodiment, the on-vehicle information processing device 10, when detecting the current position being at the parking lot near the destination, supplies the map data around the destination to the portable terminal 22 using this detection as a trigger. Alternatively, the portable terminal 22, upon receiving an indication that the vehicle has arrived at the parking lot near the destination, may request the information center for the map data around the destination and store needed map data in the memory.

Further, it may be preferable that the on-vehicle information processing device 10, when providing the map data around the destination to the portable terminal 22, also provides data on the current position at that time, namely the position where the user removes the portable terminal 22 from the on-vehicle information processing device, so that a route back to the vehicle can be also provided (i.e. the parked position is displayed on the map).

If the parking lot is located underground, it is preferable that the user provide details of the parking position and that the data input by the user through, for example, the microphone 16 be stored in the memory of the portable terminal 22. This will better ensure that the user will be able to find his/her own vehicle.

Further, in the example used in the foregoing embodiment, the state where the on-vehicle information processing device 10 and the portable terminal 22 are connected with each other is established when the portable terminal 22 is placed on the cradle 24. It is possible, however, that the connected state, namely a state where data transmission/reception is performed between the on-vehicle information processing device 10 and the portable terminal 22, is established when an ignition key of the vehicle turns ACC on, whereas when it turns ACC off the disconnected state is established and the portable terminal 22 functions solely. During the disconnected state, data indicating that the portable terminal 22 is connected with the on-vehicle information processing device 10 (referred to as "NAVI NET mode" in the foregoing description) is not transmitted to the information center. The center therefore supplies data in accordance with this disconnected state, such as news data, electronic mail data, non-audio navigation route data, or the like. Further, the portable terminal 22, which serves as an ordinary portable telephone during the disconnected state, can function as a portable telephone using the microphone 16 and the speaker 18 of the on-vehicle information processing device 10 (a so-called hands-free telephone) even when it is placed on the cradle 24.

As described above, according to the present invention, it is possible to effectively use a portable terminal in operation with an on-vehicle device to thereby provide navigation function which is further user-friendly.

While the preferred embodiment of the present invention has been described using specific terms, such description is for illustrative purposes only, and it is to be understood that changes and variations may be made without departing from the spirit or scope of the appended claims.

The entire disclosure of Japanese patent application No. Hei 11-176945 filed on Jun. 23, 1999 including specification, claims, drawings and summary are incorporated herein by reference in its entirety.

What is claimed is:

1. A portable terminal which is capable of being connected to an on-vehicle device, comprising:
a bi-directional data communication device;
a display capable of displaying text and image information;
a memory for storing data; and
a processor for receiving/transmitting various data from/to an information center in accordance with connected/disconnected sates of the portable terminal with respect to the on-vehicle device, said information center being separate from the on-vehicle device and the portable terminal, said processor, when the portable terminal is disconnected from the on-vehicle device, displaying data on said display based on data obtained from the on-vehicle device when the portable terminal is in a connected state.

2. A portable terminal according to claim 1, wherein said bi-directional data communication device receives map data from the information center.

3. A portable terminal according to claim 1, wherein when the portable terminal is connected with the on-vehicle device, said bi-directional data communication device transmits information representing the connected state to the information center.

4. A portable terminal according to claim 1, wherein when the portable terminal is connected with the on-vehicle device, the bi-directional data communication device transmits audio data obtained from said on-vehicle device to said information center.

5. A portable terminal according to claim 1, wherein the bi-directional data communication device transmits data received from the information center to the on-vehicle device when the portable terminal is connected with the on-vehicle device.

6. A portable terminal according to claim 1, wherein the bi-directional data communication device transmits running condition data supplied from the on-vehicle device to the information center when the portable terminal is connected with the on-vehicle device.

7. A portable terminal according to claim 1, wherein when the portable terminal is disconnected from the on-vehicle device, said display shows map data obtained from the on-vehicle device during a connected state.

8. A portable terminal according to claim 1, wherein said portable terminal functions as a portable telephone when it is disconnected from said on-vehicle device.

9. A portable terminal according to claim 1, wherein the bi-directional communication device receives/transmits audio data to/from the information center when the portable terminal is connected to the on-vehicle device, and receives/transmits non-audio data with respect to the information center when the portable terminal is disconnected from the on-vehicle device.

10. An on-vehicle information processing device comprising:
   an interface to be connected with the portable terminal of claim 1; and
   an on-vehicle processor for processing data supplied from said portable terminal.

11. An on-vehicle information processing device according to claim 10, further comprising a detector for detecting the current position of the vehicle on which the device is mounted, wherein said on-vehicle processor executes navigation function based on said current position and data supplied from said portable terminal.

12. An on-vehicle information processing device according to claim 10 further comprising a microphone and a speaker, wherein said on-vehicle processor transmits sound input through said microphone to the portable terminal and outputs audio data supplied from the portable terminal through the speaker.

13. An on-vehicle information processing device according to claim 10 further comprising means for supplying electrical power to said portable terminal.

14. An on-vehicle information processing device according to claim 11, wherein, when the detected current position is near a destination, said on-vehicle processor provides the portable terminal with map data showing the vicinity of the destination.

15. An on-vehicle information processing device according to claim 11, wherein, when the detected current vehicle position is near a destination, the on-vehicle processor transmits data indicating that the vehicle has arrived near the destination, to the portable terminal.

16. An on-vehicle information processing device according to claim 11, wherein, when the current vehicle position detected is near a destination, the on-vehicle processor supplies data regarding the current position to the potable terminal.

17. An on-vehicle information processing device according to claim 10, wherein, when the on-vehicle information processing device is connected to the portable terminal, the on-vehicle processor transmits data indicating the connected state to the information center via the portable information terminal device.

* * * * *